United States Patent [19]

Yabe

[11] 3,909,337
[45] Sept. 30, 1975

[54] GREEN TIRE SHAPING APPARATUS

[75] Inventor: Toshinori Yabe, Kodaira, Japan

[73] Assignee: Bridgestone Tire Company Limited, Tokyo, Japan

[22] Filed: May 25, 1973

[21] Appl. No.: 364,131

[30] Foreign Application Priority Data
May 31, 1972  Japan.............................. 47-54066

[52] U.S. Cl. ............... 156/416; 156/126; 156/128; 156/394 R; 156/396; 425/31
[51] Int. Cl.² .................. B29H 17/02; B29H 17/16; B29H 17/37
[58] Field of Search ............ 156/96, 110, 111, 123, 156/126–133, 394, 396, 398, 405–407, 414–420; 425/52, 31–36, 43, 51

[56] References Cited
UNITED STATES PATENTS

| 1,474,149 | 11/1923 | Hopkinson et al. | 156/123 |
| 2,814,330 | 11/1957 | Vanzo et al. | 156/414 |
| 2,824,336 | 2/1958 | Weigold, et al. | 425/31 |
| 2,974,714 | 3/1961 | Kraft | 156/127 |
| 3,047,048 | 7/1962 | Appleby | 156/410 |
| 3,051,220 | 8/1962 | Ewing et al. | 156/128 |
| 3,409,491 | 11/1968 | Pacciarini et al. | 156/133 |
| 3,740,292 | 6/1973 | Leblond | 156/126 |

FOREIGN PATENTS OR APPLICATIONS

| 239,897 | 7/1962 | Australia | 156/126 |
| 545,672 | 3/1959 | Belgium | 156/394 |
| 1,113,622 | 5/1968 | United Kingdom | 156/416 |

Primary Examiner—Charles E. Van Horn
Assistant Examiner—John E. Kittle
Attorney, Agent, or Firm—Waters, Schwartz & Nissen

[57] ABSTRACT

A green tire shaping apparatus which comprises a fixed frame, a swing frame swingably mounted on the fixed frame, a mechanism for swinging the swing frame, a shaping drum control arrangement mounted on the swing frame, and a tire shaping drum assembly which is detachably mounted on the shaping drum control arrangement.

5 Claims, 15 Drawing Figures

GREEN TIRE SHAPING APPARATUS

The present invention relates to the art of pneumatic tire manufacture and more particularly to a new and improved type of green tire shaping apparatus which is to be used in a tire manufacturing process in order to form a green tire into a desired shape.

A conventional tire shaping apparatus generally comprises a fixed frame and a tire shaping drum horizontally and fixedly mounted on the fixed frame for forming a green tire into a desired shape by, for example, applying a pressurized air into the green tire. Problem arises in that since the tire shaping drum is maintained horizontal, the peripheral wall of a green tire droops due to its own weight when the green tire is being applied on the shaping drum, thereby preventing smooth engagement of the green tire onto the shaping drum. Another problem is that since the shaping drum is maintained horizontal, the inflatable bag of the drum is not uniformly expanded so that the green tire is non-uniformly shaped. Since, furthermore, the shaping drum is fastened on the fixed frame, the shaped green tire should be removed from the drum for vulcanizing the shaped green tire and, at this instant, the green tire is undesirably deformed.

It is therefore a principal object of the present invention to provide a new and improved green tire shaping apparatus which makes it easy to mount a green tire to be shaped on the shaping drum thereof without unwanted deformation of the green tire.

It is another object of the present invention to provide a green tire shaping apparatus which can uniformly shape the green tire mounted on the shaping drum.

It is a further object of the present invention to provide a green tire shaping apparatus which makes it easy to subject the shaped green tire to the vulcanizing process.

According to the present invention, the abovementioned objects are achieved by a green tire shaping apparatus which comprises a fixed frame, a swing frame swingably mounted on the fixed frame, swinging means for swinging the swing frame relative to the fixed frame, a shaping drum control arrangement mounted on the swing frame, and a tire shaping drum detachably mounted on the shaping drum control arrangement.

A preferred embodiment of the present invention is illustrated in the accompanying drawings in which.

Figure 1:
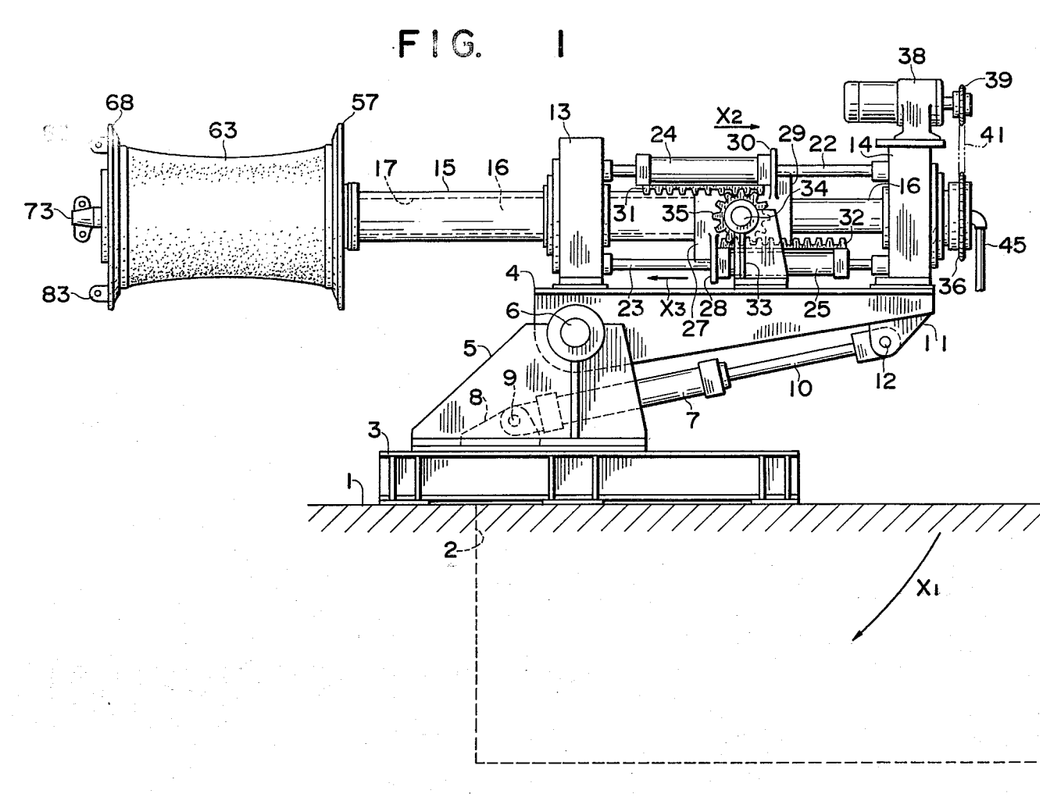
FIG. 1 is a side elevational view of a tire shaping apparatus of the present invention.
Figure 2:
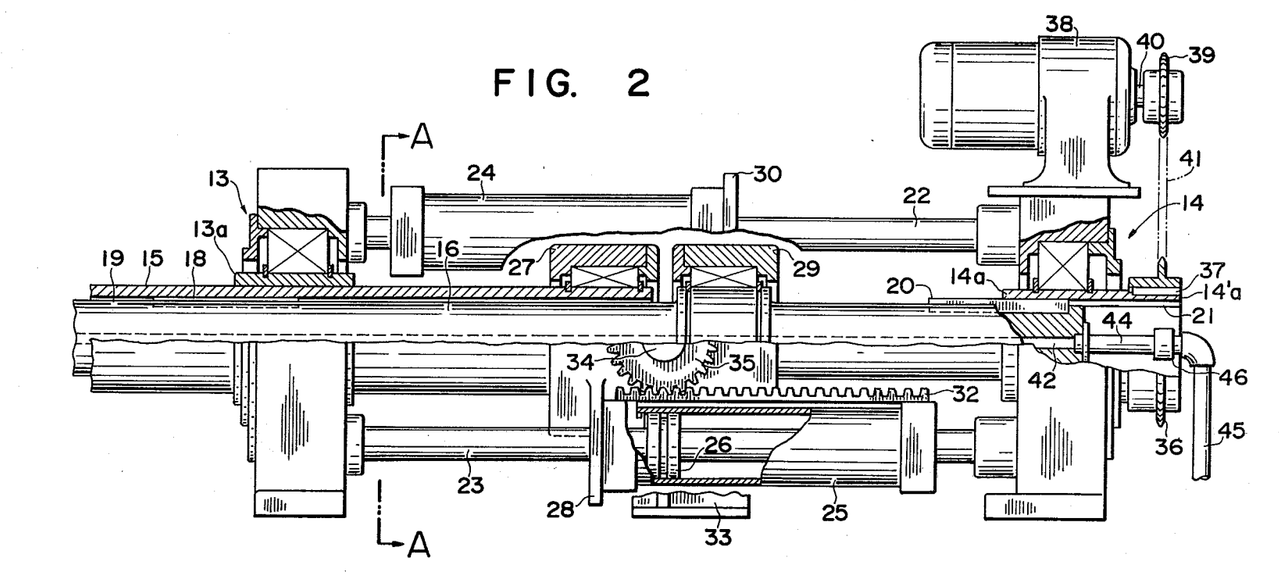
FIG. 2 is a longitudinal sectional view of a drum control portion of the apparatus of FIG. 1.
Figure 3:
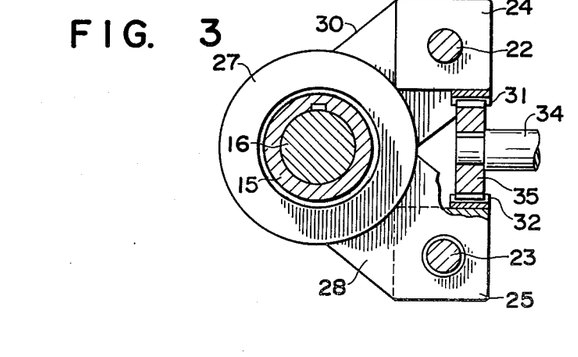
FIG. 3 is a cross sectional view taken along the line A—A of FIG. 1.

Referring now to the drawings and more particularly to FIGS. 1, 2 and 3, there is illustrated a green tire shaping apparatus of the present invention which includes a fixed frame 3 fastened on a floor 1 with a pit 2. A swing frame 4 is swingably mounted at one end portion thereof by means of a horizontal pin 6 to a bracket 5 fastened on the fixed frame 3. A fluid pressure operated cylinder assembly 7 is pivotally mounted by means of a pin 9 on a bracket 8 fastened to the fixed frame 3. The cylinder assembly 7 has a piston rod 10 whose end is pivotally connected by means of a pin 12 to a bracket 11 firmly fixed on the other end portion of the swing frame 4. A pair of bearings 13 and 14 are firmly fixed on the upper surface of the swing frame 4 in spaced and facing relation with respect to each other. A tubular sleeve 15 with a hollow 17 therein is coupled with an inner race 13a of the bearing 13. A rotary main shaft 16 is slidably inserted in the hollow 17 of the tubular sleeve 15. An axially extending key member 18 is firmly fixed on the peripheral wall of the main shaft 16 so that the key member 18 is slidably coupled with a key groove formed in the inner wall of the tubular sleeve 15, whereby the main shaft 16 is axially slidable with respect to the sleeve 15 but rotates together with the sleeve 15. The main shaft 16 is rotatably and axially slidably supported at its one end on the bearing 14. A key member 20 is fixedly mounted on the peripheral wall of the main shaft 16 in such a manner as to be coupled with an axially extended key groove 21 formed on the inner wall of the inner race 14a of the bearing 14. It will be now understood that the tubular sleeve 15 and the main shaft 16 are axially slidably journaled on the swing frame 4 while being slidable with respect to each other. A pair of fluid pressure operated cylinder assemblies are provided which respectively includes piston rods 22 and 23 which are firmly fixed at both ends to the bearing 13 and 14 in parallel relation to each other, and cylinder casings 24 and 25 with which the piston rods 22 and 23 are coupled in conventional manner, for example, as shown in FIG. 2 especially regarding the cylinder casing 25. A bearing-like assembly 27 is rotatably mounted on the rear end of the tubular sleeve 15 and is in turn connected by means of a bracket 28 to the cylinder casing 25. Another bearing-like assembly 29 is rotatably mounted on an exposed portion of the main shaft 16 between the rear end of the sleeve 15 and the bearing 14 and is in turn connected by means of a bracket 30 to the cylinder casing 24. The cylinder casings 24 and 25 respectively have on the peripheral surface thereof facing each other axially extending racks 31 and 32 as clearly shown in FIG. 3. These racks engage a pinion 35 which is freely rotatably mounted by means of a shaft 34 on the swing frame 4. A sprocket wheel 36 is firmly fixed by means of a key member 37 on a projected rear end 14a' of the inner race of the bearing 14. An electric motor 38 together with a speed reduction assembly is mounted on the upper surface of the bearing 14. A sprocket wheel 39 is firmly fixed on a shaft 40 of the motor 38. The sprocket wheels 36 and 39 are interconnected by means of a loop chain 41 so that drive of the motor 38 is transmitted to the main shaft 16. The main shaft 16 has therein a fluid conduit 42 axially extending from the rear end thereof to an opening (clearly shown in FIGS. 4 and 5) formed at the front end portion thereof. The fluid conduit 42 communicates by way of pipe 44, a rotary joint 46, a pipe 45 and a flexible pipe (not shown) with a pressurized fluid source (not shown).

Figure 4:
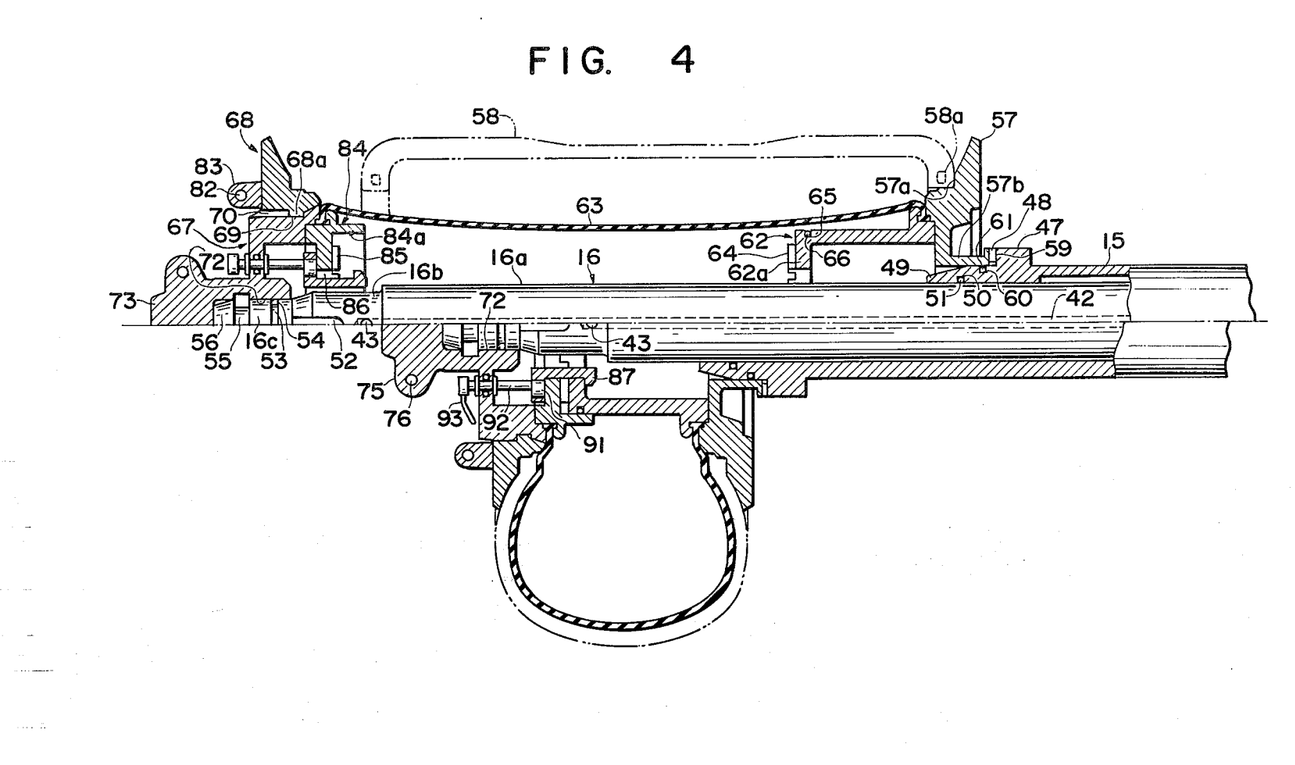
FIG. 4 is an enlarged longitudinal sectional view of the shaping drum portion of the apparatus of FIG. 1.
Figure 5:
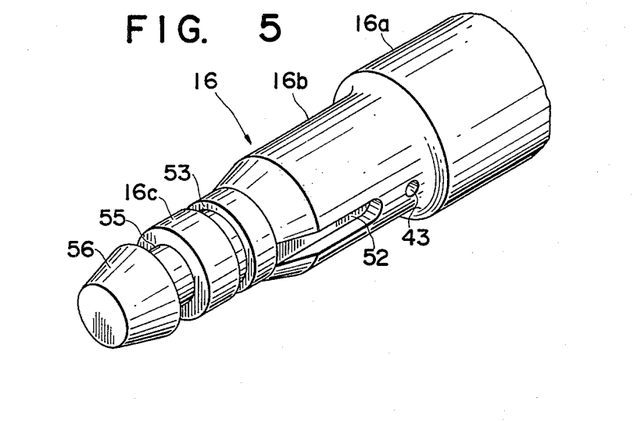
FIG. 5 is a perspective view of an end portion of a main rotary shaft of the apparatus of FIG. 1.
Figure 10:
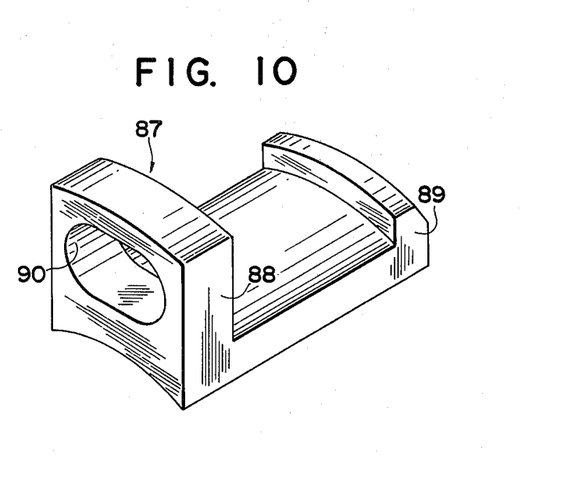
FIG. 10 is a perspective view of an element of the shaping drum assembly of the apparatus of FIG. 1.

Referring now to FIGS. 4, 10, there is shown in detail the shaping drum portion of the green tire shaping apparatus as described above. Reference numeral 47 designates an annular projection formed on the front end portion of the sleeve 15. One or more axially extending projections 48 are formed on the side surfaces of the projection 47. The front end portion of the sleeve 15 is further formed with a tapered end 49 which has in its inner wall a circumferentially extending groove 50 in which a seal ring 51 is accommodated. As clearly seen in FIG. 5, the main shaft 16 has a main portion 16a of largest diameter and a front end portion consisting of an intermediate portion 16b of an intermediate diameter and an end portion 16c of smallest diameter. An axially extending key groove 52 is formed on the peripheral wall of the intermediate portion 16b, the key groove being nearer to the end portion 16c than the opening 43. The end portion 16c has a tapered end 56, an annular groove 53 for receiving a seal ring 54 and a groove 55.

A lower bead ring 57 is detachably coupled by way of a central cylindrical portion 57b with the tapered end portion of the sleeve 15. There should be provided a locking assembly (not shown) for fastening and releasing the coupling of the bead ring 57 to the end portion 49. The cylindrical portion 57b has one or more projections 59 on its side wall so that the projections 49 engage with the projections 48 of the sleeve 15. The radially outer surfce 57a of the bead ring 57 is suitably shaped so that a bead portion 58a of a green tire indicated by phantom line 58 to be shaped is firmly and hermetically adhered to the surface 57a during the shaping process. An annular groove 60 is formed on the peripheral wall of the end portion 49, which receives an annular ring 61 for providing a sealing contact between the periphery of the end portion 49 and the inner wall of the cylindrical portion 57b. An annular sealing member 62 is so fastened at one side end thereof onto the front wall of the lower bead ring 57 as to tightly and hermetically grasp the edge portion of one open end of an inflatable shaping bag 63 in cooperation with the bead ring 57. The shaping bag 63 is made of an elastic sheet. The other side end of the annular member 62 extends axially and is formed with a radially extending annular portion 62a with having one or more projections 64 formed on the front side surface of the annular portion 62a. On the periphery of the end portion of the sealing member 62 is formed an annular groove 65 in which a seal ring 66 is accommodated.

Figure 6:
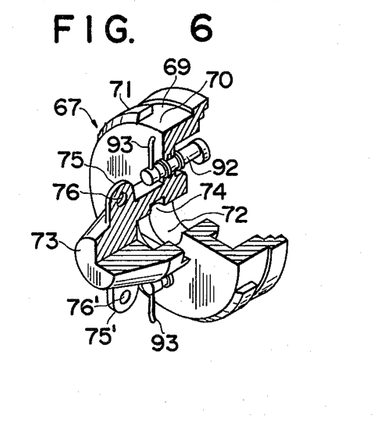
FIG. 6 is a perspective view, partly cut away, of an element of a shaping drum assembly of the apparatus of FIG. 1.
Figure 7:
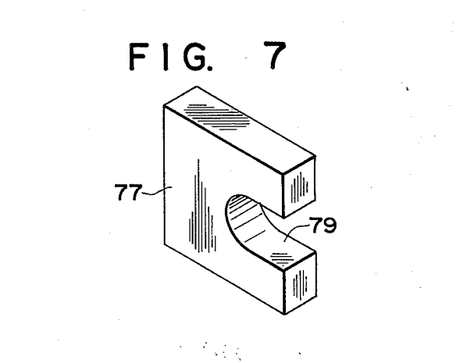
FIGS. 7 and 8 are perspective views of a pair of locking members of the apparatus of FIG. 1.
Figure 8:
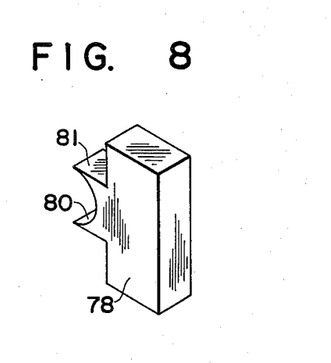

On the end portion of the main shaft 16 is detachably mounted a support member 67, more clearly shown in FIG. 6, on which an upper bead ring 68 is removably mounted. As seen in FIG. 6, a circumferentially extending groove 69 is formed in the periphery of the support member 68. One or more recesses 70 are so formed at the periphery of the support member 68 as to provide one or more projections 71. The support member 67 has therein a central bore 72 for receiving the end portion 16c of the main shaft 16. The support member 67 has a projected top end 73 on which a pair of leaf portions 75 and 75' are formed. The leaf portions 75 and 75' respectively have apertures 76 and 76' into which hooks of a lifting machine (not shown) are to be inserted when the shaping drum is disengaged from the main shaft 16 and the sleeve 15. The support member 67 is further provided with a bore 74 radially passing therethrough in such a manner as to traverse the bore 72. A pair of lock members 77 and 78 which are clearly illustrated in FIGS. 7 and 8 are inserted from both sides into the bore 74 in order to firmly connect the support member to the mian shaft 16. The lock member 77 has a concave opening 79 which is to be coupled with a projection 81 with a concave recess 80 of the lock member 78. When the lock members 77 and 78 are inserted from both sides into the bore 74, the concave opening 79 and projection 81 are coupled with each other so that the bottom of the concave opening 79 and the concave recess 80 register with the groove 55 of the end portion 16c. It is understood that a suitable lock means may be provided for fastening the coupled lock members 77 and 78, if preferred.

Figure 9:
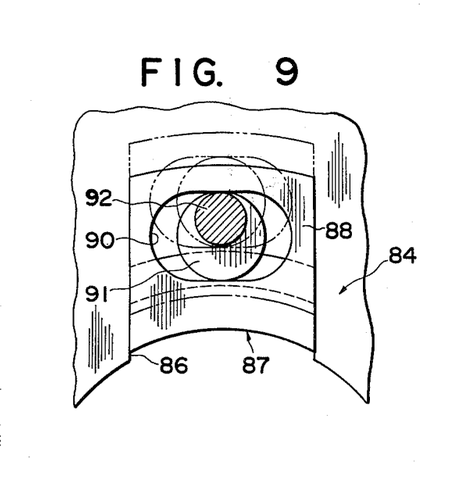
FIG. 9 is a fragmentary side view of a part of the shaping drum of the apparatus of FIG. 1.

Turning back to FIG. 4, the upper bead ring 68 has thereon a leaf member 83 with an aperture 82 for the hooking of a lifter or elevator. The bead ring 68 has on its inner wall one or more projections 68a. When it is intended to fasten the bead ring 68 to the support member 67, the bead ring 68 is first so coupled that the projections 68a pass through the recesses 70 and are then rotated with respect to the support member 67 until the projections 68a engage the projections 71. An annular sealing member 84 is coupled with the intermediate portion 16b of the main shaft 16, which is so fastened onto the rear side wall of the support member 67 as to grasp the remaining end of the shaping bag 63 in cooperation with the support member 67. The annular sealing member 84 is prevented from rotating with respect to the main shaft 16 by means of a key member (not shown) engaged in the key groove 52. The annular sealing member 84 has at the rear side wall an annular groove 84a on the bottom of which one or more projections 85 are formed. It is to be noted that the annular groove 84a and the projections 85 are so formed as to be capable of snugly coupling with the sealing member 62 and the projections 64 thereby to establish a hermetically sealed chamber in the bag 63. As clearly seen in FIG. 9, the sealing member 84 has on its inner wall a pair of grooves 86 circumferentially spaced at a substantially equal distance, each groove 86 slidably receiving an arcuate shell locking member 87 clearly illustrated in FIG. 10. The locking member 87 is radially slidably coupled at its intermediate portion between radially outwardly extending projections 88 and 89 formed at both end portions thereof. The projection 88 has therein an axially extending bore 90 which engages a cam member 91 rigidly supported by a cam rod 92 rotatably mounted in the support member 67. A handle 90 is mounted on the outer end of the cam rod 92 for manual control of the cam rod 92 from outside the support member 67. Upon the coupling of the sealing members 62 and 84, the handle 93 is manually rotated so as to radially move the locking member 87 which then secures the coupling of the sealing members 62 and 84, as shown in the lower part of FIG. 4.

The operation of the above-described tire shaping apparatus according to the present invention will be explained hereinbelow with reference to FIGS. 1 and 11 through 15.

Figure 11:
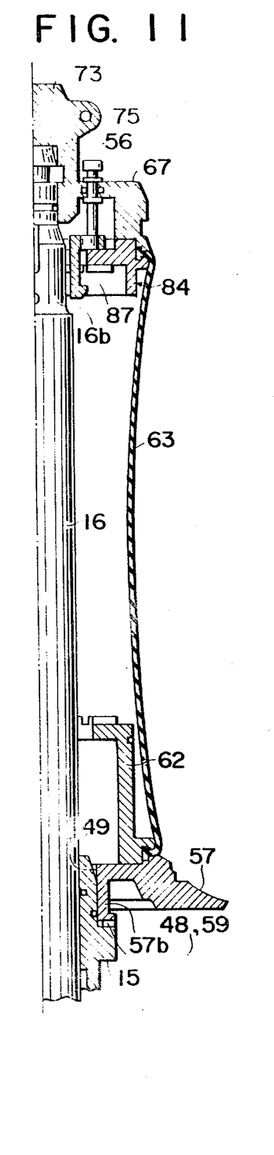
FIGS. 11 through 15 are explanatory sectional views of the operation of the shaping drum portion of the apparatus of FIG. 1.

The cylinder assembly 7 is first actuated so as to make the swing frame 4 rotate about the pin 6 in a direction indicated by an arrow $X_1$ in FIG. 1 until the rear portion of the swing frame 4 enters the pit 2 and the sleeve and shaft 15 and 16 become vertical as shown in FIG. 11. The cylinder 24 and 25 are, on the other hand, operated so that these cylinders 24 and 25 are respectively placed in leftmost and rightmost positions whereby the end portions of the sleeve and shaft 15 and 16 are most distant from each other as shown in FIG. 11. Then, the tire shaping drum assembly including the lower bead ring 57, the support member 67, the shaping bag 63, etc. is elevated by way of leaf member 75 by a suitable lifter and coupled onto the main shaft 16 and the end portion of the sleeve 15 as shown in FIG. 11. As described in detail with reference to the preceding figures, the end portion 49 of the sleeve 15 couples with the cylindrical portion 57b of the lower bead ring and the projections 48 and 59 mesh with each other. The coupling of the lower bead ring 57 onto the end portion 49 is secured by suitable means (not shown) as mentioned above. The annular ring 84 and the support member 67 respectively couple with the intermediate portion 16b and the end portion 16c of the main shaft 16 as described above. The lock members 77 and 78, respectively shown in FIGS. 7 and 8, are inserted into the bore 74 of the support member 67 so as to prevent the support member 67 from detaching from the shaft 16.

Figure 12:
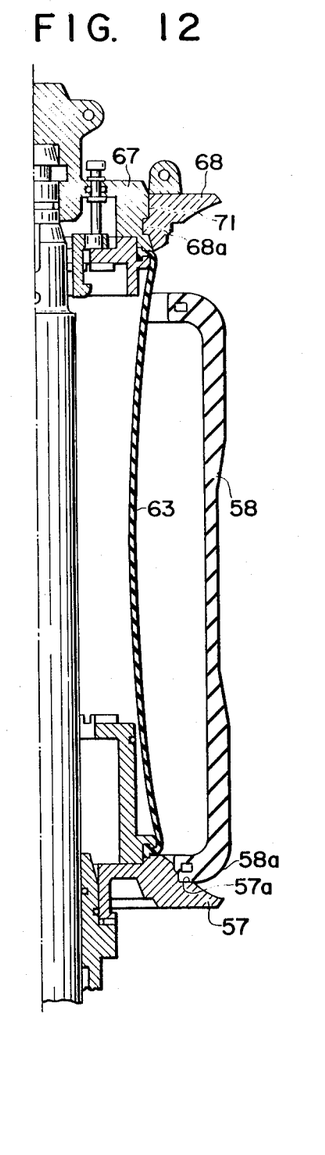

A green tire 58 which is previously fabricated is mounted around the shaping bag 63 in such a manner that the lower bead portion 58a of the green tire 58 abuts against the surface 57a of the lower bead ring 57, as illustrated in FIG. 12. The upper bead ring 68 is thereupon carried by a lifter and firmly mounted on the support member 67 by meshing the projections 68a and 71 as mentioned above.

Figure 13:
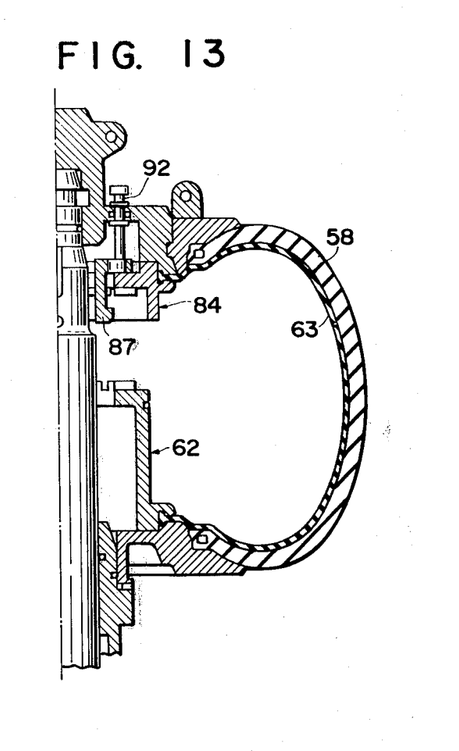

While pressurized fluid is supplied to the shaping bag 63, the cylinders 24 and 25 are operated to slide on the piston rods 22 and 23 in opposite directions indicated by arrows $X_2$ and $x_3$ in FIG. 1, whereby the shaping bag 63 together with the green tire 58 expand as shown in FIG. 13. It should be noted that since the pinion 35 engages with both racks 31 and 32 of the cylinders 24 and 25, the cylinders 24 and 25 are forced to move equidistantly with respect to each other. It is also to be noted that the pressurized fluid is delivered by way of the pipes 44 and 45, conduit 42, and opening 43. When the shaping bag 63 is filled with a predetermined amount of pressurized fluid and the annular rings 62 and 84 couple with each other, the handle 93 is actuated to cause the arcuate shell locking member 87 to secure the coupling of the annular rings 62 and 84, whereby the chamber formed in the shaping bag 63 is hermetically sealed to completely prevent the fluid in the chamber from leaking from the chamber. It is, in this instance, stopped to supply the pressurized fluid to the chamber in the bag 63.

Figure 14:
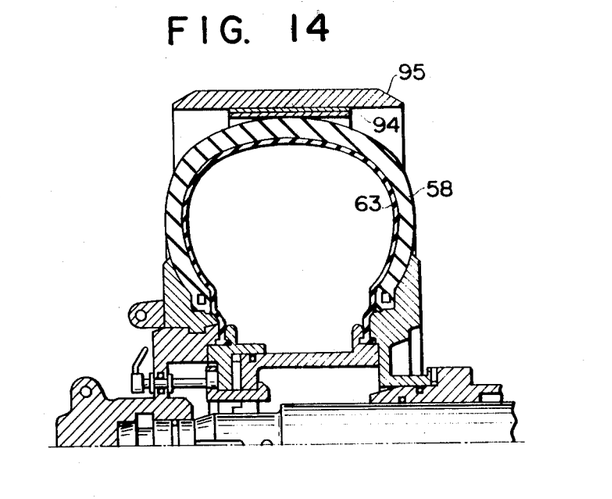

Next, the cylinder 7 is again operated to rotate the swing frame 4 about the pin 6 until the sleeve and shaft 15 and 16 become horizontal, whereby the shaping drum assembly together with the green tire 58 takes the position as shown in FIG. 14. While maintaining such position of the shaping drum assembly, the breaker and tread layers 94 and 95 are mounted on the green tire 58 as shown in FIG. 14. In this instance, the electric motor 38 is energized so as to rotate the shaping drum assembly by way of the sprocket wheel 36 and the main shaft 16 together with the sleeve 15. It is now to be noted that since the shaping drum assembly is maintained horizontal, the application of the breaker and tread layers 94 and 95 on the green tire is readily performed.

Figure 15:
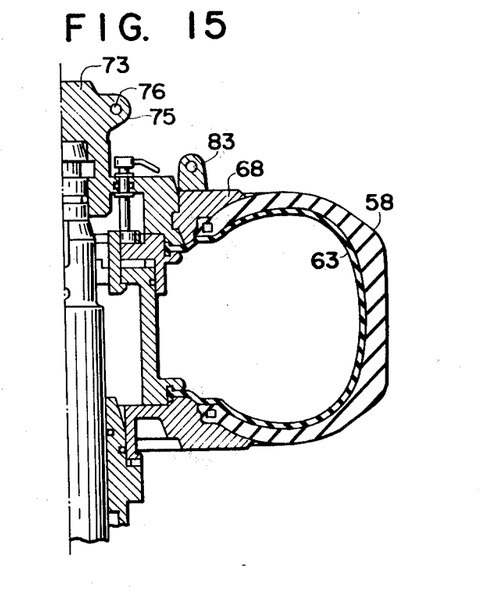

Upon completion of the application of the breaker and tread layers on the green tire, the cylinder 7 is again operated to cause the swing frame to swing about the pin 6 until the main shaft 16 together with the sleeve 15 becomes vertical as illustrated in FIG. 15. The shaping drum assembly together with the green tire is then elevated by the lifter so that the drum assembly detaches from the main shaft 16 and the sleeve 15. The hook of the lifter may be engaged with the leaf member 75 through the aperture 76. The leaf member 83 may be, in this instance, removed from the upper bead ring 68, if preferred. It is now to be noted that since the sealing of the chamber in the shaping bag 63 is maintained, the form of the green tire is desiredly kept. The shaping drum assembly thus elevated and carrying thereon the green tire is then applied in a mold of a vulcanizing apparatus. The green tire is immediately subjected to the vulcanizing process.

Although the pair of cylinders 24 and 25 are provided in the above-described shaping apparatus for moving both the shaft 16 and sleeve 15, one of the cylinders may be, of course, omitted so as to move only one of the sleeve 15 and shaft 16 with respect to the other.

It should be appreciated that since, according to the invention, a green tire is applied on the shaping drum assembly the axis of which is maintained vertical, the unwanted deformation of the green tire which has taken place in the case of the conventional shaping apparatus can be avoided. Since, further, the sealing of the chamber in the shaping bag of the apparatus is maintained even if being detached from the main shaft, the vulcanizing of the green tire can be achieved without unwanted deformation of the green tire. Furthermore, the green tire is uniformly inflated because the main shaft is maintained vertical and accordingly the beads embedded in the green tire are maintained horizontal. since the apparatus of the invention makes it unnecessary to separate the shaped green tire from the shaping drum assembly in order to subject the shaped green tire to the succeeding vulcanizing process, the green tire is not subject to unwanted deformation and the work efficiency is highly increased.

It will be understood that various changes in the details, materials and elements, which have been herein described and illustrated in order to explain the nature of the invention, amy be made by those skilled in the art, within the principle and scope of the invention as expressed in the appended claims.

I claim:

1. A tire shaping apparatus, which comprises:
    a fixed frame;
    a swing frame swingable mounted on said fixed frame;
    swinging means for swinging said swing frame from a horizontal position to a vertical position;
    a tubular sleeve slidably journaled on said swing frame;
    a main rotary shaft slidably coupled with said tubular sleeve and having therein a pressurized fluid conduit extending in the axial direction of the shaft and opened at one end;
    actuating means for sliding said sleeve and rotary shaft relative to each other;

rotating means for rotating said sleeve and rotary shaft; and a tire shaping drum including an upper bead ring assembly detachably mounted on said one end of said main rotary shaft and having an annular member with a circumferentially extending groove in one side wall thereof, a lower bead ring assembly detachably mounted on one end of said sleeve and having an annular member with a circumferentially extending projection on one side all thereof facing said upper bead ring assembly so as to be hermetically coupled with said groove, an elastic tubular member with opened ends hermetically sealed with said upper and lower bead ring assemblies so as to be capable of forming a sealed chamber by hermetically coupling said projection of said lower bead ring assembly and said groove of said upper bead ring assembly, said elastic tubular member being in communication with said conduit so that said elastic tubular member is inflated when pressurized fluid is delivered through said conduit, lock means for coupling said annular members of said upper and lower bead ring assemblies to maintain the coupling between the groove and projections thereof, and lock control means for controlling said lock means to couple and decouple said annular members of said upper and lower bead ring assemblies from said outside said upper bead ring assembly.

2. A tire shaping apparatus as claimed in claim 1, in which said annular member of said upper bead ring assembly has a plurality of recesses extending radially outwardly from the inner surface thereof and circumferentially spaced at substantially equal distances, said lock means including a plurality of arcuate shell members each having an intermediate portion slidably received in each of said recesses of said annular member of said upper bead ring assembly and a pair of projections extending radially outwardly at both the ends of said intermediate portion to hold radially inner end portions of said annular members of said upper and lower bead ring assemblies, said projection opposite to said annular member of said upper bead ring assembly having an axially extending bore, said lock control means including a plurality of cam rods each rotatably supported by said upper bead ring assembly in parallel with said main rotary shaft and having one end rigidly supporting a cam member engaged in said axially extending bore, the other remaining end extending outwardly of said upper bead ring assembly, and a handle connected to said other remaining end of each cam rod for facilitating manual operation of said cam rod from the outside of said upper bead ring assembly.

3. A tire shaping apparatus as claimed in claim 1, in which said swinging means includes a fluid pressure operated cylinder arrangement fastened to said fixed frame and having a piston rod connected at one end thereof to said swing frame, said swing frame being pivotally mounted on said fixed frame.

4. A tire shaping apparatus as claimed in claim 1, in which said actuating means includes a pair of radial bearings respectively rotatably coupled with said sleeve and rotary shaft, and a fluid pressure arrangement engaged with said radial bearings for moving said bearings in opposite directions.

5. A tire shaping apparatus as claimed in claim 1, in which said fluid pressure arrangement includes a first fluid pressure operated cylinder assembly having a cylinder casing with a rack on the periphery thereof fastened on said one radial bearing connected to said sleeve and a piston rod axially slidably passing through said casing and connected at both ends thereof to said swing frame, a second fluid pressure operated cylinder assembly having a cylinder casing with a rack on the periphery thereof fastened to the other radial bearing connected to said main rotary shaft and a piston rod axially slidably passing through said casing and connected at both ends thereof to said swing frame, and a pinion rotatably mounted on said swing frame and in mesh with the racks of said cylinder casings of said first and second fluid pressure operated cylinder assemblies.

* * * * *